Jan. 17, 1939.                L. Y. BOOHARIN                2,144,357
VEHICLE BUMPER
Filed Jan. 12, 1937
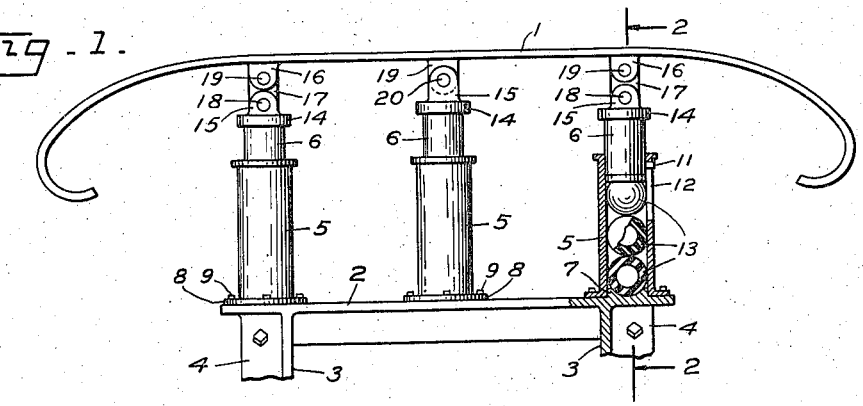
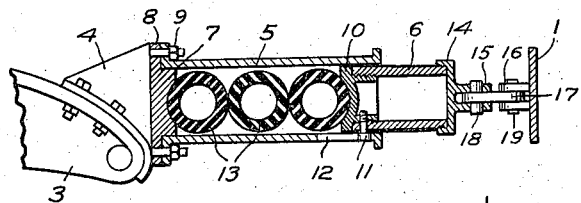
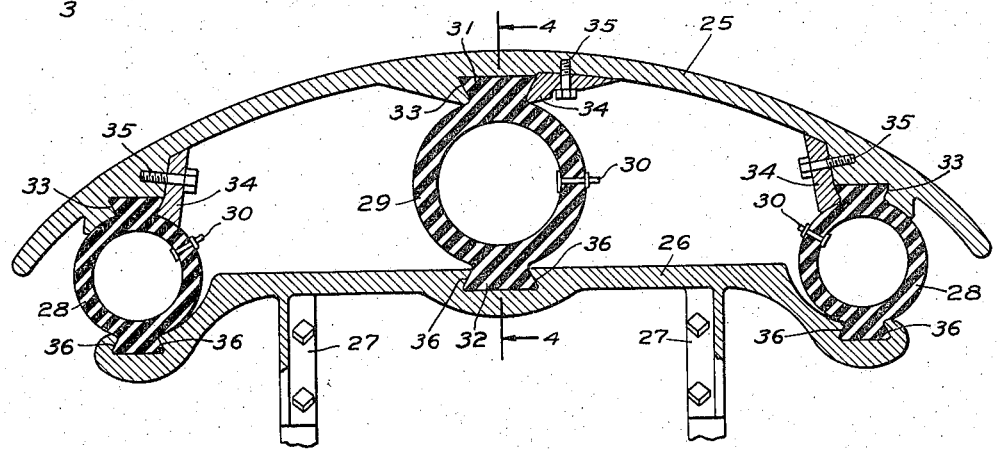
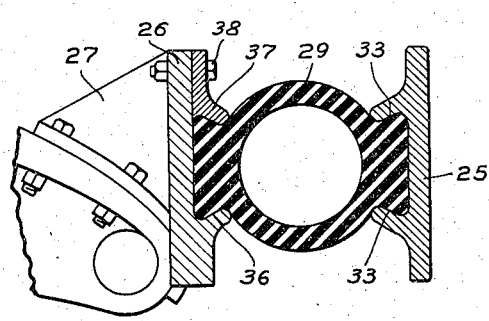
INVENTOR.
LEO Y. BOOHARIN
BY
A. W. Boyken
ATTORNEY.

Patented Jan. 17, 1939

2,144,357

UNITED STATES PATENT OFFICE 2,144,357

VEHICLE BUMPER

Leo Y. Booharin, San Francisco, Calif., assignor of one-fourth to Leon Scherbakoff, one-fourth to Dan Leskovsky, and one-fourth to George D. Collins Application January 12, 1937, Serial No. 120,145

1 Claim. (Cl. 293—55)

This invention relates to vehicle bumpers as used on automobiles for absorbing shocks and for preventing injury to the vehicle.

The objects of the invention are to provide a vehicle bumper adapted to more efficiently absorb the shocks from collision with objects than heretofore, and which bumper is simple to make, strong, durable and easy to assemble and in which air is the principal medium for absorbing the shocks. Other objects and advantages will appear in the specification and drawing annexed hereto.

In the drawing, Fig. 1 is a plan view of my improved bumper, a part of the vehicle chassis being shown, and part of the bumper broken away to show its construction.

Fig. 2 is a sectional view as seen along the line 2—2 of Fig. 1.

Fig. 3 is a horizontal sectional view through a modified form of bumper.

Fig. 4 is a sectional view as seen along the line 4—4 of Fig. 3.

In detail, the form of invention illustrated in Figs. 1, 2, comprises a horizontally extending bumper strip, 1, preferably of relatively strong spring steel, which bumper strip is secured to an elongated supporting member 2 spaced from and extending horizontally in substantially opposed relation to strip 1, the member 2 extending across the front end of the vehicle such as an automobile, and secured to the front ends of the side frame members 3 of the automobile chassis by brackets 4.

In the form shown in Figs. 1, 2, the strip 1 is disposed in a horizontal plane common to both strip 1 and member 2 and is connected to and supported in said plane from member 2 by three spaced connecting devices two of which are respectively disposed directly in front of the front ends of the side frame members 3, and the third device being positioned centrally between the other two. Each of the two devices at opposite sides of the central device comprises a cylinder 5 secured to member 2 at one end and projecting outwardly toward strip 1, and a smaller cylinder 6 secured to strip 1 at one end and projecting from said strip toward member 2, the outer end of cylinder 6 telescopically fitting within the outer end of cylinder 5.

The member 2 may be in the form of a casting with three bosses 7 projecting from the side thereof facing strip 1, which bosses respectively are adapted to fit within the ends of the cylinders 5 that are adjacent thereto, the axially facing sides of the bosses, relative to the longitudinal axis of the cylinders, being concave. The cylinders 5 are each formed with an outwardly projecting flange 8 adjacent member 2, which flange is formed with bolt openings to receive stud bolts 9 projecting from member 2 for bolting the cylinder 5 to the member 2.

Each of the smaller diameter cylinders 6 carries a plug 10 at the end thereof within the cylinder 5, which plug is concave on its side facing the concave side of boss 7. A pin 11 threadedly extends through the cylinder 6 and the portion of plug 10 that threadedly projects into the outer end of cylinder 5, the outer end of pin 11 slidably extending through a slot 12 in the wall of cylinder 5 at a point adjacent the outer end of said cylinder. Between plug 10 and boss 7 are a row of separate hollow rubber balls 13 of almost the same diameter as the inside diameter of cylinder 5. The end balls of the row fit in the concave sides of boss 7 and plug 10 respectively, and the balls are proportioned to yieldably urge cylinder 6 in a direction outwardly of the outer end of cylinder 5 until the pin 11 firmly engages the outer closed end of slot 12.

A cap 14 secured to the outer end of each of the cylinders 6 carries a pair of spaced outwardly projecting lugs 15 and the side of strip 1 has a pair of similar lugs 16 projecting toward lugs 15. A short connecting link 17 is pivotally secured at its opposite ends between lugs 15 and lugs 16 by vertical pivots 18, 19, respectively.

The central connection is identical with the two connections above described, with the exception of the connection between cylinder 6 and strip 1, hence all similar parts are similarly numbered.

In the centrally disposed connection, I eliminate the link 17 and lugs 16, and instead, a single lug 19 projects directly from strip 1 to between the lugs 15 of cap 14 and is connected therebetween by a single vertical pivot pin 20.

It will be seen from the foregoing, that the shock of any object striking the bumper strip 1 at any point along the side thereof facing outwardly relative to the chassis, will be absorbed by the balls 13 and the air confined in the balls, and none of the telescopically arranged cylinders 5, 6 will bind by reason of the object striking to one side or the other of the centrally disposed cylinders. The cylinder 5 confining the balls 13 will prevent any possibility of the balls bursting due to any unusual shock, and the resistance to movement of the bumper strip 1 toward member 2 and the chassis will progressively increase as the bumper strip moves toward member 2. The balls 13, being separate from each other, are easily and quickly replaced, as may be desired. The bumper strip 1, may of course, be of slightly channel form, if desired, with the open side of the channel facing member 10, should greater rigidity in said strip be desired.

The form of bumper shown in Figs. 3, 4 incorporates the idea of using the hollow balls and the compressible characteristic of air therein to absorb the shocks.

In this form of device I provide a bumper strip 25 spaced forwardly of the chassis of the automobile and extending across the front ends of the side frame members of the chassis. An elongated supporting member 26 is directly secured to the front ends of said side frame members by brackets 27 cast on said member 26, which member is disposed generally in opposed relation to strip 25.

The bumper strip is secured to and supported in spaced relation from supporting member 26 by three hollow rubber balls, one ball 28 being at each end of member and a large ball 29 being centrally disposed along the member 26 and strip 25 between balls 28. The balls 28, 29 formed with relatively heavy walls incorporating fabric or cord reinforcing therein and each ball may be provided with a valve 30 for admission of air under compression to within the balls to vary the resiliency of the balls as may be desired.

A detailed description of the means connecting the central ball 29 between strip 25 and member 26 will apply equally to the means connecting the end balls 28 in position, the numerals identifying the latter means being provided to distinguish.

Ball 29 is formed on two opposite sides with projections 31, 32 each being in the shape of a frustrum of a pyramid having a rectangular base with the smaller end connecting with the ball and the base outermost. The bumper strip 25 is formed on its inner side, or the side facing member 26, with a recess having three inner sides 33 formed to closely fit three of the lateral sides of the projection 31 on one side of the ball and a clamp 34 formed to fit against the fourth side of the projection is removably secured to strip 25 by a bolt 35. Thus the ball 29 may be slipped laterally into the recess and when clamp 33 is secured in position, the ball is firmly held to strip 25.

Member 26 is similarly formed with a recess having three similar sides 36 adapted to fit against three of the sides of the projection 32, and a clamp 37 is secured against the fourth side by a bolt 38.

As above stated the balls 28 which are smaller than ball 29, are similarly secured in place, the projections, sides of the recesses and bolts being similarly numbered, except that they are primed.

In some instances, I have substituted the central telescopic connecting cylinders and balls therein of Fig. 1 for the central ball 29 of Fig. 2, such substitution being obvious.

With the above construction it will be seen that a certain longitudinal movement of bumper strip 25 is permitted without sacrificing the shock absorbing qualities of the balls, and without permanently distorting the relationship between the member 26 and strip 25. Also the resiliency of the balls may be regulated by the air pressure in the balls.

The use of air in both of the forms overcomes the objections to springs, or hydraulic type bumpers, since the air gives a greater range within which the shocks are absorbed and is more sensitive to variations in the force of the shock.

Referring again to Figs. 1, 2, it is, of course, obvious that the balls 13 are of smaller diameter than the inside diameter of the cylinders 5 in order to permit stretching of the balls toward a generally flattened shape upon collapsing of the cylinders 5, 6; thus the balls will not be jammed in one end of cylinder 5, but will be free to recover their shape and to freely force the cylinder 6 outwardly and while air in the balls is the principal medium for absorbing the shocks, the elasticity of the walls of the balls also serves to absorb the shocks.

Having described my invention, I claim:

In combination, a vehicle frame, a bumper strip, and means for resiliently securing said bumper strip to said frame comprising a plurality of cylindrically hollow members closed at one end and secured to said frame at said end, a single row of hollow spherical balls of an external diameter equal to the internal diameter of said cylindrically hollow member disposed in each member, piston-like plungers fitted into the other ends of said members to confine the respective rows of balls therewithin, pivotal connections between said strip and said plungers, one of said pivotal connections including a single pivot only, and at least one of the remaining pivotal connections including a link pivotally connected to the strip at one of its ends and pivotally connected to the plunger at its other end.

LEO Y. BOOHARIN.